(12) United States Patent
Oh et al.

(10) Patent No.: US 11,243,423 B1
(45) Date of Patent: Feb. 8, 2022

(54) UNIFORM BEZEL DISPLAY WITH OFF-AXIS ILLUMINATION

(71) Applicant: Dell Products L.P., Round Rock, TX (US)

(72) Inventors: Guentaek Oh, Singapore (SG); Hyunseok Ko, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/143,853

(22) Filed: Jan. 7, 2021

(51) Int. Cl.
  *G02F 1/1333* (2006.01)
  *G02F 1/13357* (2006.01)
  *F21V 8/00* (2006.01)

(52) U.S. Cl.
  CPC ......... *G02F 1/13332* (2021.01); *G02B 6/002* (2013.01); *G02B 6/0055* (2013.01); *G02B 6/0073* (2013.01); *G02F 1/133331* (2021.01); *G02F 1/133605* (2013.01); *G02F 1/133615* (2013.01)

(58) Field of Classification Search
  None
  See application file for complete search history.

(56) References Cited

U.S. PATENT DOCUMENTS

2015/0198831 A1* 7/2015 Kim ............... G02F 1/13336
  345/1.3
2021/0026060 A1* 1/2021 Ye ................. G02B 6/0028

* cited by examiner

*Primary Examiner* — Richard H Kim
(74) *Attorney, Agent, or Firm* — Zagorin Cave LLP; Robert W. Holland

(57) ABSTRACT

A uniform bezel display uses off-axis illumination from within a rear cavity to direct light into a backlight that distributes the light to a liquid crystal display panel. A light source, such as plural LEDs interfaced with a circuit board, is disposed on a beveled surface formed in the cavity and aligned to direct light into a reflective surface of the backlight interior. Offset placement of the light source in a cavity of the display housing reduces the footprint of the light source at the side of the housing perimeter so that a uniform width bezel will cover the LCD panel around the housing perimeter.

17 Claims, 3 Drawing Sheets

UNIFORM BEZEL DISPLAY WITH OFF-AXIS ILLUMINATION

BACKGROUND OF THE INVENTION

Field of the Invention

The present invention relates in general to the field of information handling system displays, and more particularly to a uniform bezel display with off-axis illumination.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at a display. For example, an information handling system graphics processor defines visual images as an array of color values that match an array of pixels in a display. The color values are scanned to the pixels by a timing controller so that the pixels present the colors, thereby generating a composite of illumination that defines the visual image. One common type of peripheral flat panel display used to present visual images from an information handling system is a liquid crystal display (LCD). An LCD panel has plural pixels with each pixel having a red, green and blue liquid crystal material. A backlight provides illumination from behind the pixels that passes through the red, green and blue liquid crystal material to provide filtered light that combines to a defined color of illumination. For example, the liquid crystal material adjusts the amount of light that passes through by changes in an electric field to change the crystalline state. Different levels of illumination from each of the red, green and blue liquid crystal material define the color of the light that is presented at a pixel. A high resolution peripheral display may include thousands of pixels that can define visual images with a fine granularity. For instance, an ultrahigh definition display (UHD) includes approximately 4,000 pixels.

One difficulty with presentation of high resolution visual images at an LCD is that a backlight generally must provide a uniform illumination from behind the LCD panel. To achieve a uniform distribution of illumination through the pixels, backlights typically include a light guide material to carry illumination and reflectors that keep the illumination within the light guide material until distribution to the pixels, such as through diffusor and polarizer layers. Generally, illumination enters the backlight along one side of the display panel and is distributed through the pixels in a regulated manner, such as a varied distribution of openings. If illumination is not evenly distributed, hot spots and dark spots may disrupt presentation of visual images at the display panel. Generally, illumination directed into a backlight is provided from a row of evenly spaced light emitting diodes (LEDs) deployed at a bottom side of the display panel perimeter. This arrangement tends to provide a predictable illumination readily managed for even distribution to the light guide.

One difficulty with providing illumination at a side surface of the backlight is that the perimeter of the backlight tends to extend out further in order to provide room to accommodate the backlight. As a result, the bezel that surrounds the display panel perimeter has a greater width along the bottom side or whichever side includes the LEDs. A non-uniform bezel detracts from the presentation of visual information by have the visual images off center. In addition, if the display is used with a second display, different sized bezels aligned next to each other create an awkward presentation. For example, if two displays are rotated from a landscape to a portrait orientation and then place next to each other, a top side of one display will align next to a bottom side of the other. When the LED is located in the bottom side, then the bezel of one display will line up next to a different sized bezel of the other display so that paired images presented in coordination at both displays will appear off center.

SUMMARY OF THE INVENTION

Therefore, a need has arisen for a system and method which provides a uniform bezel display with off-axis illumination.

In accordance with the present invention, a system and method are provided which substantially reduce the disadvantages and problems associated with previous methods and systems for providing illumination into a display backlight. A display housing forms a cavity at one side of its perimeter to couple a light source in a recessed position and offset axis so that light emitted from the light source is directed at a reflective side surface of a backlight at the housing perimeter and into the backlight for distribution at the rear side of a liquid crystal display panel.

More specifically, a display presents visual images defined by pixel values applied to a liquid crystal display panel's pixels that are illuminated from behind by a backlight. The backlight contains a light guide plate of light transmissive material within reflective interior walls so that light directed into the backlight is distributed evenly at the display panel rear side. The backlight has an opening in the reflective material at one side through which light is directed by a light source, such as plural light emitting diodes (LEDs) coupled to a circuit board. The light source couples to the housing in a cavity at a beveled surface directed off axis of the backlight plane and towards the housing perimeter side surface where a reflective interior side surface of the backlight directs the light into the backlight interior for distribution to the display panel. The recessed position and off axis direction of the light source compresses the footprint of the display at the side having the light source so that the perimeter of the display housing relative to the display panel is uniform around the display perimeter. A bezel of uniform width couples to the display housing, such as over a cover glass of the display panel so that visual images are presented by the display panel centered at the display housing.

The present invention provides a number of important technical advantages. One example of an important technical advantage is that a uniform bezel display has a bezel of equal proportions around the display panel perimeter. The uniform bezel provides an improved user experience with a center of display content between adjacent display panels better supporting coordinated presentation across multiple displays. Off-axis insertion of illumination reduces spacing associated with coupling of an LED light source to a light guide perimeter by displacing the illumination source to a rearward position. Reflection of the illumination from the off-axis and into the light guide offers excellent light transmission characteristics for an even pixel illumination across the display panel.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Visual images generated at an information handling system are presented in a central location of a display panel having a uniform bezel supported by off-axis illumination. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
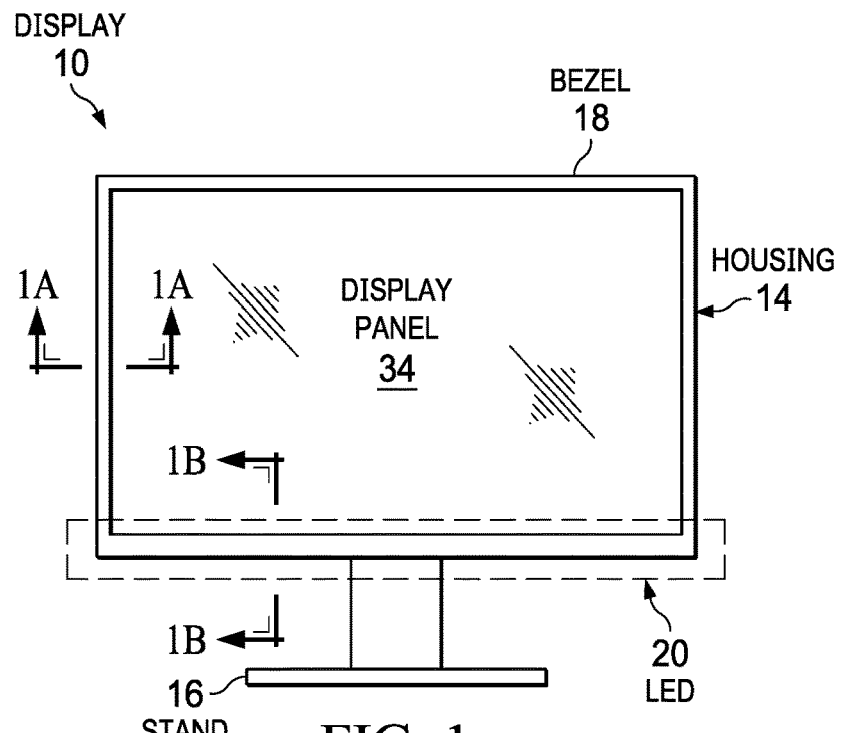
FIG. 1 depicts a front view of a conventional display having a bottom with a bezel of a greater width than the sides and top.

Referring now to FIG. 1, a front view depicts a conventional display 10 having a bottom with a bezel 18 of a greater width than the sides and top. Display 10 presents visual images with a liquid crystal display (LCD) panel 12 coupled in a housing 14 that is held in a raised vertical position over a desktop by stand 16. A perimeter of housing 14 has a bezel 18, such a width of dark plastic, that couples over a cover glass to hide the border of the display panel. At the top and sides of housing 14, bezel 18 has an even width between the outer perimeter of LCD panel 12 and the outer perimeter of housing 14. At the bottom of housing 14, a light source 20 provides illumination at the rear side of LCD panel 12 so that the visual images defined by LCD pixels are visible. For example, light source 20 is a set of evenly-spaced light emitting diodes (LEDs) coupled to a circuit board and spread out along the length of the bottom of housing 14. Light source 20 in this conventional display tends to increase the width at the bottom of housing 14 as the circuit board that holds the LEDs consumes some space at the housing edge so that a wider bezel is needed to cover the portion of the display where no pixels are found for presenting visual images at the edge of LCD panel 12. One result of the uneven bezel 18 found on conventional display 10 is that visual images presented on display panel 12 are not located in a central location of housing 14. As one example, when housing 14 is rotated from the landscape orientation shown in FIG. 1 to a portrait orientation, the uneven bezel widths of the top and bottom of two displays next to each other will not present a balanced coordinated visual image.

Figure 1A:
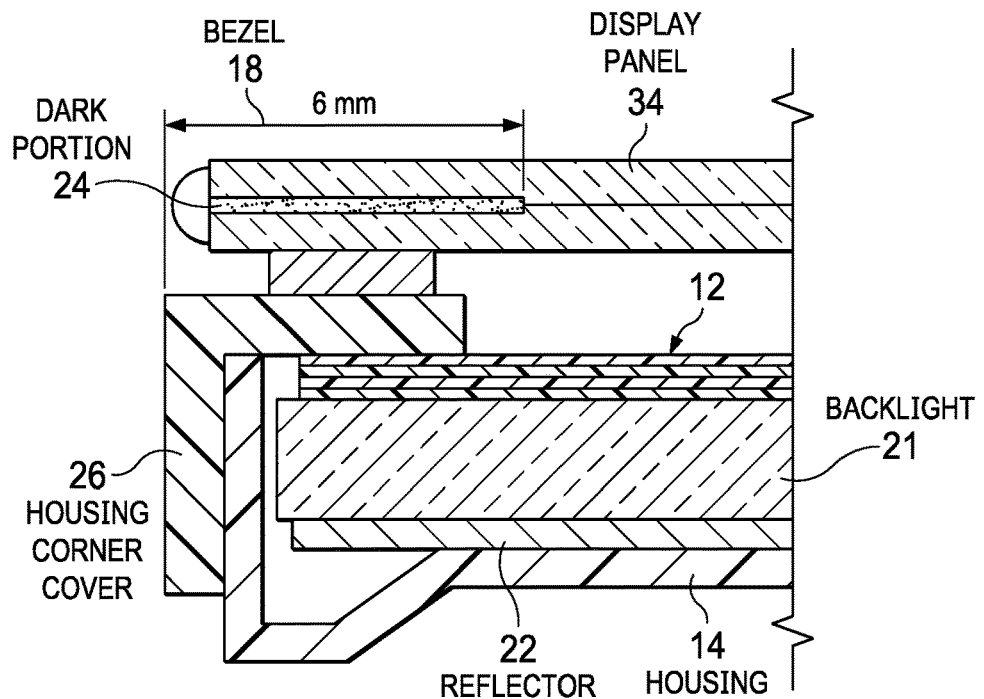
FIG. 1A depicts a sectional view of the conventional display cut through at the side and top.

Referring now to FIG. 1A, a sectional view depicts the conventional display 14 cut through at the side and top. Housing 14 contains a backlight 21 that distributes illumination to the rear surface of LCD panel 12 and that is filtered by LCD panel 12 pixels to generate a visual image as a composite of the pixels. Backlight 21 has interior walls covered by a reflector 22 that keeps light within a light guide plate material disposed in backlight 21, such as a light transmissive plastic. In the example embodiment, a housing corner cover 26 captures LCD panel 12 and backlight 21 in housing 14 and a cover glass 34 couples over housing 14 and LCD panel 12 to protect LCD panel 12 from damage. In the example embodiment, bezel 18 has a width of 6.0 mm and is implemented with a dark material 24, such as paint, included in cover glass 34. In alternative embodiments, a plastic piece may couple over cover glass 34 with or without the paint. Bezel 18 covers the edge of LCD panel 12 so that portions of the display panel that do not present visual images are hidden from a view of display 10. The sectional view of FIG. 1A is implemented at the top and sides of display 10 where light provided from the light source enters at the bottom of housing 14.

Figure 1B:
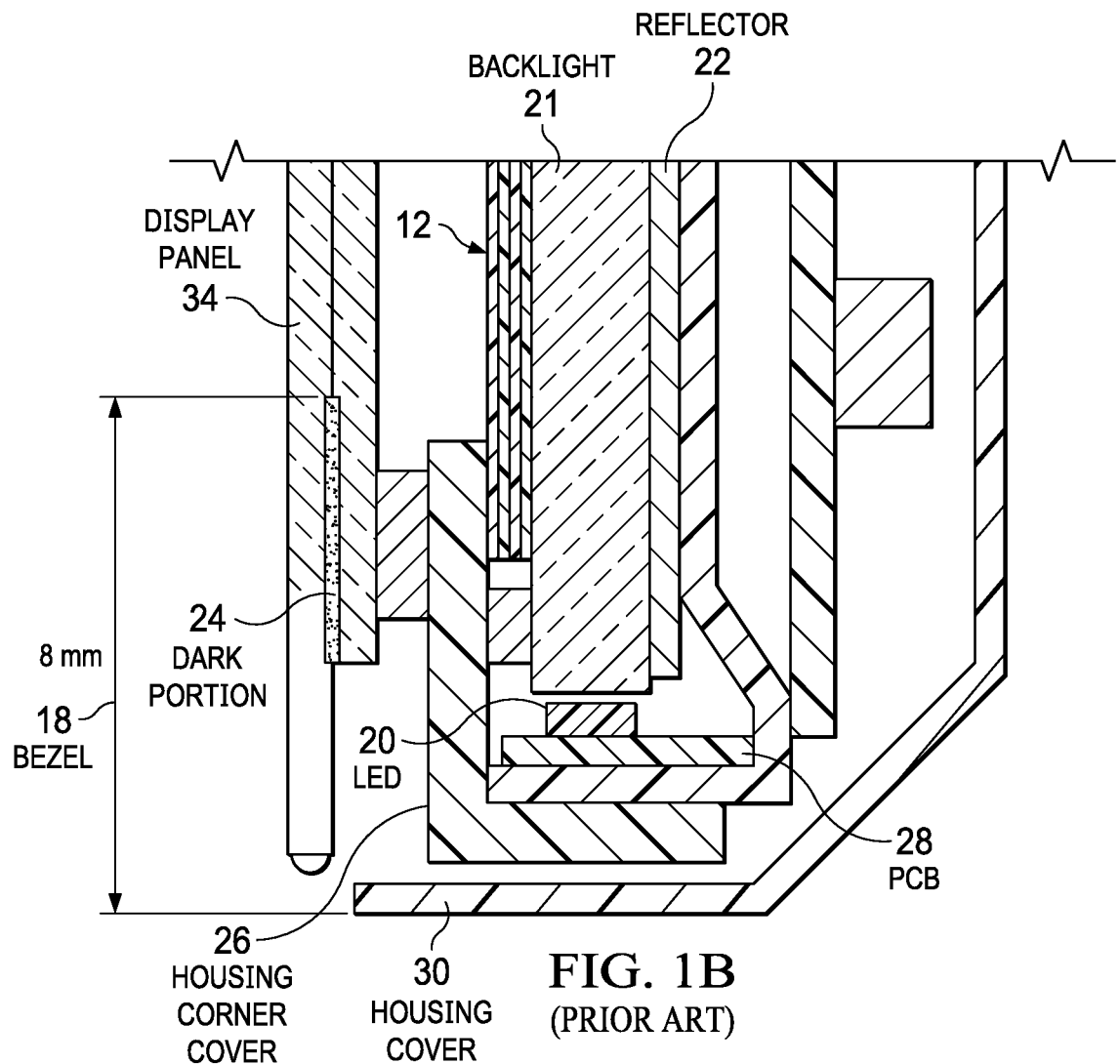
FIG. 1B depicts a sectional view of the conventional display cut through at the bottom to illustrate convention light insertion to a backlight light guide.

Referring now to FIG. 1B, a sectional view depicts the conventional display 10 cut through at the bottom to illustrate conventional light insertion to a backlight 21 light guide. Light from an LED light source 20 enters backlight 21 from the bottom of housing 14. In order to provide space for light source 20 and the printed circuit board 28 that powers the LEDs, housing 14 is extend downward at the bottom by 2.0 mm so that the bezel 18 that covers the outside perimeter of cover glass 34 has a width of 8.0 mm. Light source 20 is coplanar with backlight 21 to direct light into backlight 21 on axis with the backlight plane.

Figure 2:
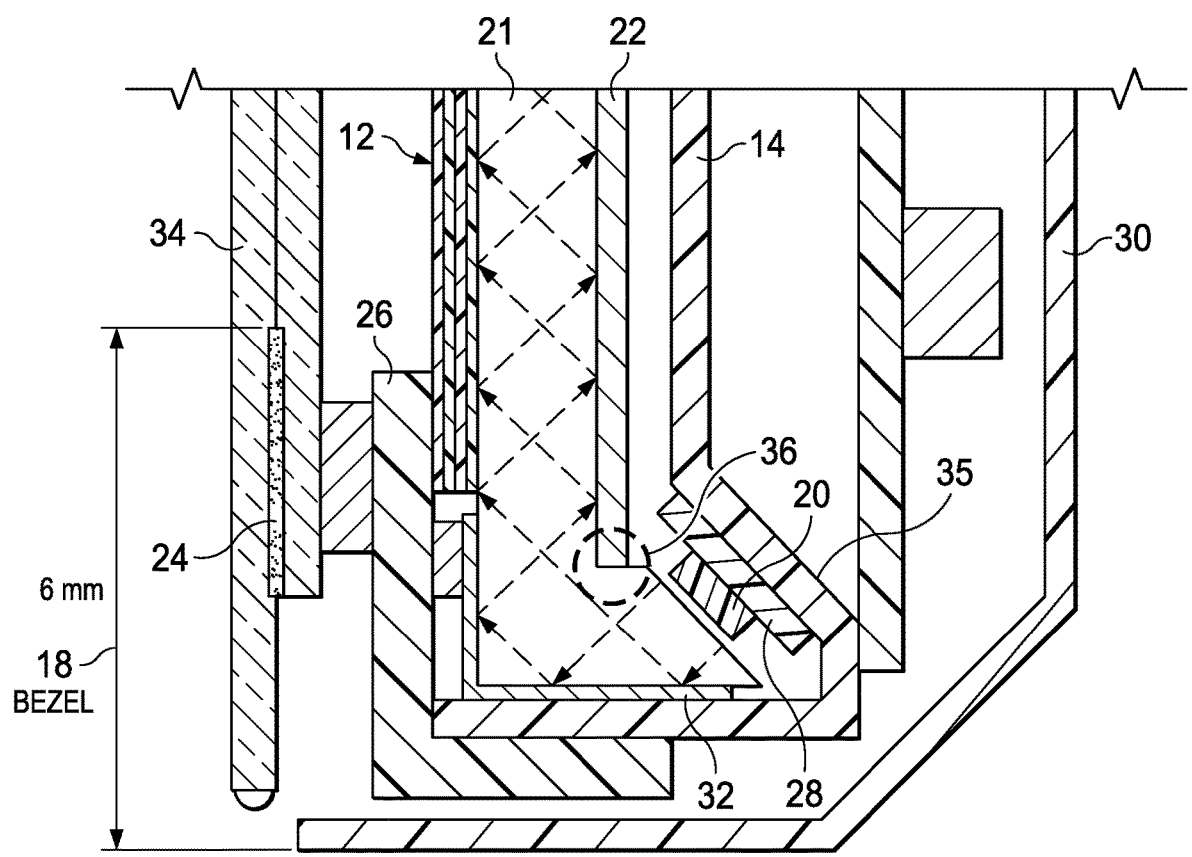
FIG. 2 depicts a sectional view of a display cut through at the bottom portion to have off-axis illumination into the backlight.

Referring now to FIG. 2, a sectional view depicts a display 10 cut through at the bottom portion to have off-axis illumination into the backlight 21. In the example embodiment, a beveled rear surface 35 of housing 14 defines a cavity in which light source 20 and printed circuit board 28 are coupled. As is evident in FIG. 1A, beveled rear surface 35 forms the cavity around the entire perimeter of housing 14, such as to create space at the exterior rear side of housing 14 to hold electronic components of the display, such as a power supply, timing controller and other components. A rear cover 30 couples to the rear of housing 14 to enclose the electronic components. In alternative embodiments, the cavity may be included only on the side of the housing that holds light source 20. Although the example embodiment places light source 20 at a bottom of housing 14, in alternative embodiments light guide 20 could be included in the cavity of housing 14 at any of the four sides of housing 14.

Coupling light source 20 to beveled rear surface 35 of housing 14 recesses light source 20 towards the rear of housing 14 and away from the perimeter so that bezel 18 can have a uniform width over the placement of light source 20 as other sides of the perimeter of housing 14. In order to direct illumination from light source 20 to the interior of backlight 21 light source 20 illuminates at an angle of approximately 45 degrees off plane from backlight 21 and towards the side perimeter of housing 14 where reflective surface 22 directs the illumination towards the interior, as indicated by the arrows illustrated within backlight 21. To aid in transmission of illumination into the light guide material of backlight 21, the material is extended into the cavity to just above and parallel with the LED of light source 20. Reflector 22 has an opening where illumination enters with a corner 36 extending across printed circuit board 28 to meet the light guide material that enters the cavity. In alternative embodiments, light source 20 may have varied off-axis illumination directions and physical media that redirect the illumination into light guide 21.

Although the present invention has been described in detail, it should be understood that various changes, substitutions and alterations can be made hereto without departing from the spirit and scope of the invention as defined by the appended claims.

What is claimed is:

1. A display comprising:
   a housing having a perimeter, the housing defining a cavity at a rear side of at least a portion of the perimeter, the cavity having a beveled surface;
   a liquid crystal display panel coupled to a front of the housing and operable to define a visual image;
   a backlight disposed in the housing under the liquid crystal display panel and operable to illuminate the visual image for presentation at the front of the housing; and
   a light source coupled to the beveled surface in the cavity and operable to generate light, the light source directed towards a side surface of the perimeter of the housing, the backlight having a reflector at the side surface to direct the light towards the liquid crystal display panel, the reflector normal to a plane of the backlight.

2. The display of claim 1 further comprising:
   a cover glass disposed over the liquid crystal display panel; and
   a bezel disposed over the cover glass around the perimeter of the housing, the bezel having a uniform width around the full perimeter.

3. The display of claim 2 wherein the light source comprises plural light emitting diodes disposed on a circuit board along one side of the housing perimeter.

4. The display of claim 1 wherein the beveled surface is offset from the plane of the backlight by substantially 45 degrees.

5. The display of claim 1 wherein the backlight extends into the cavity at the one side of the housing perimeter.

6. The display of claim 5 wherein the backlight comprises a reflector disposed at a bottom surface and at side surfaces around the entire side surface of the housing perimeter, the reflector having an opening along the cavity aligned with the light source.

7. The display of claim 6 wherein the reflector extends partially across the cavity.

8. The display of claim 7 wherein the cavity is formed around the entire housing perimeter, the display further comprising a rear cover coupled to the rear side of the housing.

9. A method for directing illumination into a display backlight, the method comprising:
   forming a cavity of a housing to have a beveled surface off-axis to a plane of the backlight;
   coupling a light source in the cavity of the housing to the beveled surface and directed towards a side of a perimeter of the housing having a reflector normal to the plane of the backlight; and
   reflecting light from the light source with the reflector disposed at the side of the perimeter of the housing and into the backlight.

10. The method of claim 9 wherein the backlight includes a reflector at a bottom surface having an opening proximate the light source and extending partially across the cavity.

11. The method of claim 10 wherein the light source comprises plural light emitting diodes coupled to a circuit board at only one side of the perimeter.

12. The method of claim 9 further comprising:
   coupling a cover glass over the housing; and
   coupling a bezel over the cover glass at the perimeter, the bezel having a uniform width at all sides of the perimeter.

13. The method of claim 12 further comprising:
   coupling a liquid crystal display panel over the backlight and under the cover glass; and
   defining a viewing area of the display panel with the bezel.

14. A display comprising:
   a housing having a cavity formed around a perimeter;
   a light source coupled to the cavity at one side of the perimeter and operable to direct light towards the side of the housing; and
   a backlight coupled to the housing and having a reflective interior to distribute illumination, the reflective interior having an opening at the cavity to accept the light and having a reflective side surface at the one side to reflect light from the side of the housing into the reflective interiors;
   wherein the cavity is formed with a beveled rear surface and the light source couples to the beveled rear surface to direct light at an angle offset from a plane of the backlight.

15. The display of claim 14 further comprising:
   a liquid crystal display panel disposed over the backlight and operable to present visual images with light passed through from the backlight; and
   a uniform width bezel coupled over the liquid crystal display panel at the perimeter.

16. The display of claim 15 further comprising:
   a cover glass coupled over the liquid crystal display panel; and
   wherein the bezel comprises paint disposed over the cover glass.

17. The display of claim 16 wherein the bezel further comprises a plastic piece having a uniform width on all sides.

* * * * *